United States Patent
Sowerby et al.

(10) Patent No.: US 10,402,931 B2
(45) Date of Patent: Sep. 3, 2019

(54) SYSTRACE VISUALIZATION TOOL

(71) Applicant: Apple Inc., Cupertino, CA (US)

(72) Inventors: Andrew M. Sowerby, San Francisco, CA (US); Ahmet S. Tekin, Cupertino, CA (US); Joseph E. Grzywacz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/732,754

(22) Filed: Jun. 7, 2015

(65) Prior Publication Data

US 2016/0358302 A1    Dec. 8, 2016

(51) Int. Cl.
*G06T 1/20*    (2006.01)
*G09G 5/36*    (2006.01)

(52) U.S. Cl.
CPC ............... *G06T 1/20* (2013.01); *G09G 5/363* (2013.01); *G09G 2340/00* (2013.01); *G09G 2360/08* (2013.01); *G09G 2360/12* (2013.01)

(58) Field of Classification Search
None
See application file for complete search history.

(56) References Cited

U.S. PATENT DOCUMENTS

| | | | |
|---|---|---|---|
| 7,627,857 B2 | 12/2009 | Rokosz | |
| 2006/0112373 A1* | 5/2006 | Rokosz | G06F 11/3664 717/125 |
| 2010/0039436 A1* | 2/2010 | Krishna | G01C 23/00 345/522 |
| 2012/0268470 A1 | 10/2012 | Duca | |
| 2013/0162661 A1 | 6/2013 | Bolz | |
| 2014/0146062 A1* | 5/2014 | Kiel | G06F 11/3664 345/522 |
| 2014/0208083 A1* | 7/2014 | Burnett | G06F 9/38 712/228 |
| 2015/0355996 A1* | 12/2015 | Smith | G06F 11/3636 717/128 |
| 2016/0104263 A1* | 4/2016 | Chen | G09G 5/00 345/506 |
| 2016/0210719 A1* | 7/2016 | Pelton | G06T 1/20 |

OTHER PUBLICATIONS

Tanasic, et al., "Efficient Exception Handling Support for GPUs," In Proceedings of MICRO-50, Cambridge, MA, USA, Oct. 14-18, 2017, 14 pages.

* cited by examiner

*Primary Examiner* — Yi Wang
(74) *Attorney, Agent, or Firm* — Blank Rome LLP

(57) ABSTRACT

Tracking GPU tasks includes receiving a GPU command buffer, executing the command buffer, and generating events in response to execution of the command buffer, each event generated at a different portion of a GPU pipeline. Generating events includes tagging each event with a unique event-type identifier, tagging each event so as to identify the command buffer, and storing each tagged event is in a memory. Displaying GPU tasks, including obtaining, from a kernel portion of an operating system, event records of a first type, partitioning the events into two or more collections of event records, and displaying two or more of the event records of the first collection in a first temporally ordered sequence.

16 Claims, 6 Drawing Sheets

| 270 APPLICATION A | 271 PHOTO MGMNT APP | 272 FINANCIAL APP | 273 MOVIE APP | 274 APPLICATION B |
|---|---|---|---|---|
| 260 OTHER APPLICATION SERVICES | 261 SPRITE KIT | 262 SCENE KIT | 263 CORE ANIMATION | 264 CORE GRAPHICS |
| 250 O/S SERVICES | 251 OPENGL | 252 METAL | 253 SOFTWARE RAYTRACER | 254 SOFTWARE RASTERIZER |
| O/S KERNEL 245 | | | | |
| HARDWARE 240 | | | | |

SYSTRACE VISUALIZATION TOOL

BACKGROUND

This disclosure relates generally to the field of graphics processing, and more particularly to the field of providing a system activity visualization tool.

Graphics processor units (GPUs) have become important for processing data-parallel graphics tasks. Developers now recognize that non-graphics data-parallel tasks can also be handled by GPUs, taking advantage of their massive parallel capabilities. Vendors and standards organizations have created application programming interfaces (APIs) that make graphics data-parallel tasks easier to program because of the high level of developer programming interaction. However, there are also low-level APIs (libraries/frameworks, etc.) that reside closer to hardware and are generally employed by applying the output of the higher level APIs. In other words, the higher level APIs generally simply prepare program code for application to the lower level APIs.

Graphics commands generally run through a GPU pipeline, which may include various levels between an application (software) and the hardware used to execute that software. At various locations in the pipeline, a graphics command may generate events. In order for a developer to get a good understanding about what is happening in the pipeline, a thread-based operation is often used. However, due to the processing capabilities of the GPU, a thread-based snapshot may not be sufficient to provide a holistic picture for a developer regarding work being performed in the GPU pipeline.

SUMMARY

In one embodiment, a method tracking GPU tasks is provided. The method includes receiving a GPU command buffer, executing the command buffer, and generating events in response to execution of the command buffer, each event generated at a different portion of a GPU pipeline. Generating events includes tagging each event with a unique event-type identifier, tagging each event so as to identify the command buffer, and storing each tagged event in a memory. In another embodiment, the method for identifying GPU tasks may be embodied in computer executable program code and stored in a non-transitory storage device. In yet another embodiment, the method may be implemented in an electronic device having image capture capabilities.

In another embodiment, a method for displaying GPU tasks is provided. The method obtaining, from a kernel portion of an operating system, a plurality of event records of a first type, partitioning the plurality of events into two or more collections of event records, wherein each event record in each collection includes a tag associating the event records with the first type, and displaying two or more of the event records of the first collection in a first temporally ordered sequence. In another embodiment, the method for displaying GPU tasks may be embodied in computer executable program code and stored in a non-transitory storage device.

BRIEF DESCRIPTION OF THE DRAWINGS

FIG. 2 shows an illustrative software layer and architecture diagram, according to one or more embodiments

DETAILED DESCRIPTION

Figure 1:
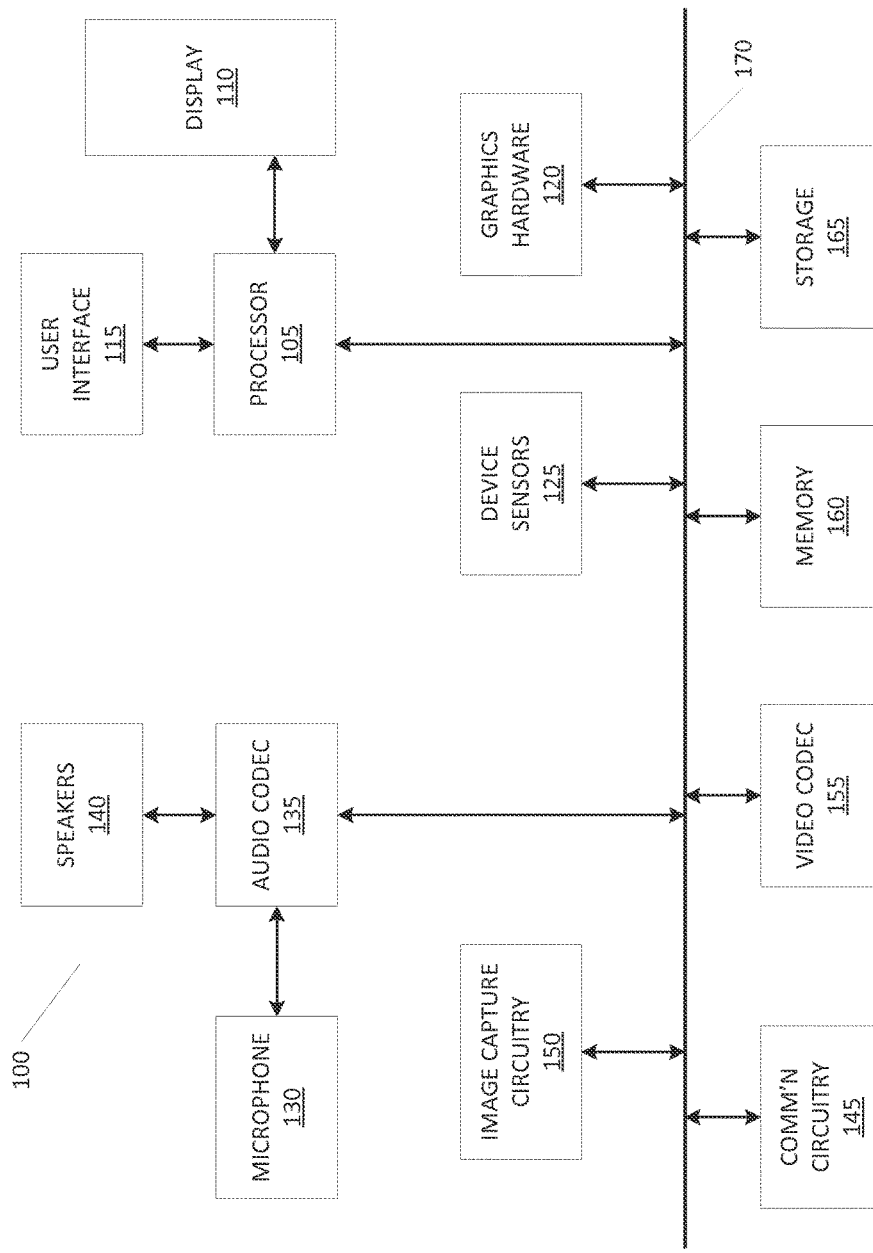
FIG. 1 shows, in block diagram form, a representative computer node that may be used, for example, as an end-user machine or a developer machine, according to one or more embodiments.

This disclosure pertains to systems, methods, and computer readable media to improve the operation of graphics systems. More specifically, the present disclosure is directed to tagging and storing events generated during execution of a command buffer such that the events may later be retrieved based on event type. Thus, the various events generated by command buffers as their corresponding instructions or commands are executed may be identified based on work type rather than thread. Further, in one or more embodiments, the various events may also be tagged with an identifier indicating an originating command buffer. The present disclosure is also directed to a method for displaying events generated during command buffer execution in a user interface. Tagging events with an event type allows a developer to later retrieve all events of a particular type, regardless of their originating command buffer. In one or more embodiments, the displayed events may also indicate a command buffer identifier indicating the command buffer that generated the events. Displaying events based on event type may provide a holistic view of work performed by the GPU.

In the following description, for purposes of explanation, numerous specific details are set forth in order to provide a thorough understanding of the inventive concept. As part of this description, some of this disclosure's drawings represent structures and devices in block diagram form in order to avoid obscuring the inventive concepts. In this context, it should be understood that references to numbered drawing elements without associated identifiers (e.g., 100) refer to all instances of the drawing element with identifiers (e.g., 100A and 100B). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the inventive subject matter. Reference in this disclosure to "one embodiment" or to "an embodiment" means that a particular feature, structure, or characteristic described in connection with the embodiment is included in at least one embodiment of the invention, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

Referring to FIG. 1, the disclosed embodiments may be performed by representative computer system 100. For example the representative computer system 100 may act as a software development platform or an end-user device. System 100 may be embodied in any type of device such as a general purpose computer system, a television, a set top box, a media player, a multi-media entertainment system, an image processing workstation, a hand-held device, or any device that may be coupled with or incorporate display or presentation devices as discussed herein. Computer system 100 may include one or more processors 105, memory 160, one or more storage devices 165, and graphics hardware 120. Computer system 100 may also have device sensors 125, which may include depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermal sensors, etc. These and other sensors may work in combination with one or more GPUs, DSPs, or conventional microprocessors along with appropriate programming so the sensor outputs may be properly interpreted and/or combined and interpreted.

System 100 may also include user interface 115, and display 110—all of which may be coupled via system bus or backplane 170. Memory 160 may include one or more different types of media used by processor 105 and graphics hardware 120 (e.g., solid-state, DRAM, optical, magnetic, etc.). For example, memory 110 may include memory cache, read-only memory (ROM), and/or random access memory (RAM). Storage 165 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 160 and storage 165 may be used to retain media (e.g., audio, image, and video files), preference information, device profile information, computer program instructions organized into one or more modules and written in any desired computer programming language or combination of programming languages, and any other suitable data. When executed by processor 105 and/or graphics hardware 120 (also a processor), such computer program code may implement one or more of the methods or processes described herein. Communication circuitry 145 may include semiconductor-based circuits and may be used to connect computer system 100 to one or more networks. Illustrative networks include, but are not limited to: a local network, such as a USB network; a business's local area network; and a wide area network, such as the Internet; and may use any suitable technology (e.g., wired or wireless). Communications technologies that may be implemented include cell-based communications (e.g., LTE, CDMA, GSM, HSDPA, etc.) or other communications (Ethernet, WiFi, Bluetooth, USB, Thunderbolt, Firewire, etc.). User interface 115 may be used to connect keyboard (not pictured), microphone 130, pointer device, speaker 140, and other user interface devices such as a touchpad and/or a touch screen (not shown). A display adapter may be used to connect one or more display units 110 through frame buffers (not shown).

Processor 105 may execute instructions necessary to carry out or control the operation of many functions performed by system 100 (e.g., evaluation, transformation, and graphics work including compilation of graphics programs). Processor 105 may, for instance, drive display 110 and receive user input from user interface 115 or any other user interfaces embodied by a system. User interface 115, for example, can take a variety of forms, such as a button, a keypad, a dial, a click wheel, a keyboard, a display screen, and/or a touch screen. The user interface items or widgets may be generated by the graphics hardware 120 in real time as a user interacts with the interface. Processor 105 may be any type of computing device such as one or more microprocessors working alone or in combination with GPUs, DSPs, and/or system-on-chip devices such as those found in mobile devices. Processor 105 may include one or more dedicated GPUs or graphics subsystems that accept program instructions to create or alter display information such as pixels. In addition, processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 in performing computational tasks. In some embodiments, graphics hardware 120 may include CPU-integrated graphics and/or one or more programmable GPUs.

Sensor and camera circuitry 150 may capture still and video images that may be processed, at least in part, by video codec(s) 155 and/or processor 105 and/or graphics hardware 120, and/or a dedicated image processing unit incorporated within circuitry 150. Images so captured may be stored in memory 160 and/or storage 165.

Information so captured may be stored in memory 160 and/or storage 165 and/or any storage accessible on an attached network. Memory 160 may include one or more different types of media used by processor 105, graphics hardware 120, and sensors 125 to perform device functions. Storage 165 may store data such as media (e.g., audio, image, and video files); metadata for media; computer program instructions; and other software; including database applications (e.g., a database storing avatar frames), preference information, device profile information, and any other suitable data. Memory 160 and storage 165 may be used to retain computer program instructions or code organized into one or more modules in either compiled form or written in any desired computer programming language. When executed by, for example, processor 105, such computer program code may implement one or more of the acts or functions described herein (e.g., implementing graphics frameworks and/or facilitating the graphics rendering function).

As noted above, embodiments of the inventions disclosed herein include software. As such, a description of common computing software architecture is provided as expressed in a layer diagram in FIG. 2. Like the hardware examples, the software architecture discussed here is not intended to be exclusive in any way, but rather to be illustrative. This is especially true for layer-type diagrams, which software developers tend to express in somewhat differing ways. In this case, the description begins with layers starting with the base hardware layer 295 illustrating hardware, which may include CPUs and GPUs or other processing and/or computer hardware. Above the hardware layer is the O/S kernel layer 290 showing an example as O/S kernel 245, which is kernel software that may perform memory management, device management, and system calls (often the purview of hardware drivers). The notation employed here is generally intended to imply that software elements shown in a layer use resources from the layers below and provide services to layers above. However, in practice, all components of a particular software element may not behave entirely in that manner.

Returning to FIG. 2, layer 285 is the O/S services layer, exemplified by O/S services 250. O/S services may provide core O/S functions that execute in a protected environment. In addition, O/S services shown in layer 285 may include frameworks for OpenGL® 251, Metal 252, Software Raytracer 253, and a Pure Software Rasterizer 254. (OPENGL is a registered trademark of Silicon Graphics International Corporation.) These particular examples all relate to graphics and/or graphics libraries and are chosen to illuminate the topic of many embodiments herein, which relate to graphics handling. These particular examples also represent graphics frameworks/libraries that may operate in the lower tier of frameworks, that allow developers to use shading and graphics primitives and/or obtain fairly tightly coupled control over the graphics hardware. In addition, the particular examples named in layer 385 may pass their work product on directly to hardware or hardware drivers, which is software typically tightly coupled to the hardware.

Referring again to FIG. 2, OpenGL 251 represents an example of a well-known library and application programming interface for graphics rendering 2D and 3D graphics. Metal 252 also represents a published graphics library and framework, but it is lower level than OpenGL 251, supporting fine-grained, low-level control of the organization, processing, and submission of graphics and computational commands, as well as the management of associated data and resources for those commands. Software Raytracer 253 is software for creating image information based upon the process of tracing the path of light through pixels in the plane of an image. Software Rasterizer 254 refers generally to software used to make graphics information such as pixels without specialized graphics hardware (e.g., using only the CPU). These libraries or frameworks shown within the O/S services layer 285 are only exemplary and intended to show the general level of the layer and how it relates to other software in a sample arrangement (e.g., kernel operations usually below and higher-level Applications Services 260 usually above). In addition, it may be useful to note that Metal 252 represents a published framework/library of Apple Inc. that is known to developers in the art.

In the particular embodiment illustrated in FIG. 2, above the O/S services layer 285 is an Application Services layer 280, which includes Sprite Kit 261, Scene Kit 262, Core Animation 263, and Core Graphics 264. The O/S services layer represents higher-level frameworks that are commonly directly accessed by application programs. In some embodiments the O/S services layer may include graphics-related frameworks that are high level in that they are agnostic to the underlying graphics libraries (such as those discussed with respect to layer 285). In such embodiments, these higher-level graphics frameworks are meant to provide developer access to graphics functionality in a more user/developer-friendly way and to allow developers to avoid work with shading and graphics primitives. By way of example, Sprite Kit 261 is a graphics rendering and animation infrastructure that may be used to animate textured 2D images, or "sprites." Scene Kit 262 is a 3D-rendering framework that supports the import, manipulation, and rendering of 3D assets at a higher level than frameworks having similar capabilities, such as OpenGL. Core Animation 263 is a graphics rendering and animation infrastructure that may be used to animate views and other visual elements of an application. Core Graphics 264 represents a drawing engine that provides 2D rendering for applications.

Above the application services layer 280, there is the application layer 275, which may comprise any type of application program. By way of example, FIG. 2 shows three specific applications: a photo management, editing, and sharing program 271, a financial management program 272, and a movie making and sharing program 273. Application layer 275 also shows two generic applications 270 and 274, which represent the presence of any other applications that may interact with or be part of the embodiments disclosed herein. Generally, the disclosed embodiments may employ and/or interact with applications that produce displayable/viewable content.

In evaluating O/S services layer 285 and applications services layer 280, it may be useful to realize that different frameworks have higher- or lower-level APIs, even if the frameworks are represented in the same layer of the FIG. 2 diagram. The illustration of FIG. 2 serves to provide a general guideline and to introduce exemplary frameworks that may be discussed later. Furthermore, some embodiments as disclosed herein may imply that frameworks in layer 280 make use of the libraries represented in layer 285. Thus, FIG. 2 provides intellectual reinforcement for these examples. Importantly, FIG. 2 is not intended to limit the types of frameworks or libraries that may be used in any particular way or in any particular embodiment. Generally, many of the disclosed embodiments propose software activity and architecture in the layers between the hardware 240 and application 275 layers, shown in system C100.

With reference again to FIG. 2, some embodiments may suggest the use of higher-level frameworks, such as those shown in application services layer 280. The high-level frameworks may perform intelligent analysis on particular graphics requests from application programs. The high-level framework may then choose a specific hardware and/or a specific library or low-level framework to help process the request. In these embodiments, the intelligent analysis may provide for on-the-fly decision making regarding the best path for the graphics request to follow down to hardware.

Figure 3:
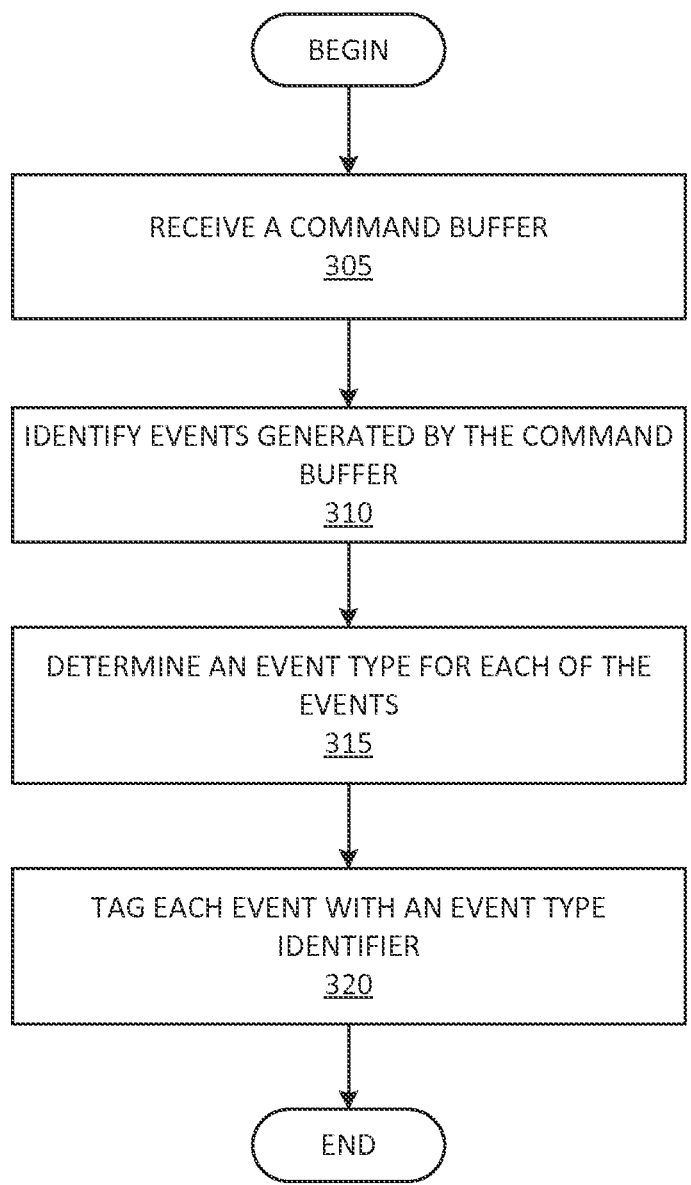
FIG. 3 shows, in flowchart form, a method for identifying GPU tasks, according to one or more embodiments FIG. 4 show, in flowchart form, a method for displaying GPU tasks, according to one or more embodiments.

FIG. 3 shows, in flowchart form, a method for identifying GPU tasks, according to one or more embodiments. At 305, a command buffer is received in a GPU pipeline. As used herein, a "command buffer" may be thought of as a container for encoded commands (i.e., a logical or functional amount of work) intended for or associated with a GPU. A command buffer may store encoded commands until the buffer is committed for execution by the GPU. A single command buffer may contain many different kinds of encoded commands. Command encoders come in several types, including, but not limited to, render encoders, compute encoders, and blit encoders. Render encoders may be used to encode graphics rendering commands into a command buffer. Compute encoders may be associated with compute functions. Blit encoders may provide methods for copying data between resources, such as buffers and textures, and may be used to access image data that is rendered off-screen.

At 310, events generated by the command buffer are identified. At run time, command buffers may be generated by applications and passed towards the GPU, through the GPU pipeline. As the command buffer steps through the GPU pipeline, debug events may be generated. Events may be generated at various portions of a GPU pipeline. For example, the CPU may generate debug events at the application, driver, and kernel levels, and the GPU may generate debug events at the hardware level.

At 315, an event type for each of the events may be determined, and at 320, events may be tagged with an event type identifier. According to one or more embodiments, every event need not be tagged, and only events, or types of events, that a developer is interested may be tagged. In one or more embodiments, the event type may identify a type of command buffer, such as a render encoder or a compute encoder. Further, in one or more embodiments, the event type may be determined by the command buffer that caused the event to be generated.

At 320, events may be tagged with an event type identifier. In one or more embodiments, events may be tagged with an identifier identifying a type of command buffer that generated the event. Alternatively, or additionally, events may be tagged with a unique identifier representing the specific command buffer that generated the event. In one or more embodiments, tagging the event includes storing an identifier within the structure of the event itself. That is, a debug event may be structured to include debug code, along with CPU data, and various ARG (argument) fields. The tags for the event may be stored in the ARG fields. Once the events are tagged, the events may be stored in kernel memory, such as non-paged kernel memory.

Figure 4:
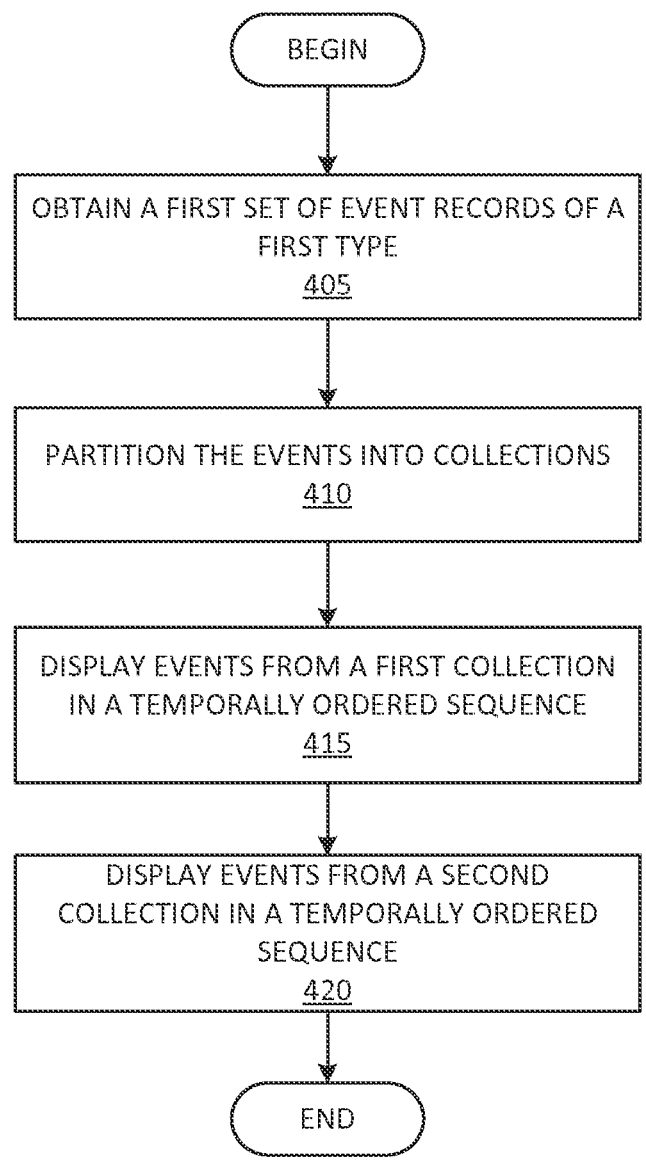

FIG. 4 shows, in flowchart form, a method for displaying GPU tasks, according to one or more embodiments. The various components of FIG. 4 may be performed by a systrace visualization tool. At 405, a first set of event records of a first type are obtained. In one or more embodiments, the first set of events may be tied to a specific command buffer type, such as a render encoder, or a compute encoder.

At 410, the events may be partitioned into collections. The events may be partitioned, for example, based on a particular command buffer. In one or more embodiments, the event records may be stored in kernel memory after being tagged with identifiers indicating an event type and/or a command buffer that caused the event to be generated. The events may be partitioned into collections based on the tags.

At 415, one or more of the events may be displayed on a display device from a first collection of events in a temporal sequence. In one or more embodiments, the events may be displayed on a display device in any format that indicates that the events are displayed in a temporal order. For example, the events may be displayed sequentially vertically, sequentially horizontally, in a timeline, graphically, or by any other means which indicates a temporal order to the events being displayed.

At 420, in one or more embodiments, events from a second collection may also be displayed in a temporally ordered sequence. In one or more embodiments, the second collection may include events tagged with a different command buffer than the first collection. The event records of the second collection may be displayed such that they are visually distinct from the event records of the first collection. That is, in one or more embodiments, the event records from the first collection and the event records of the second collection may be displayed concurrently, but in a manner in which they are distinct. In one or more embodiments the first collection and the second collection may be displayed as different graphical objects, or may be displayed on different parts of the screen, or any other manner by which the two collections are visually distinct.

It should be understood that the various components of the flowcharts described above may be performed in a different order or simultaneously, and some components may even be omitted in one or more embodiments.

Figure 5:
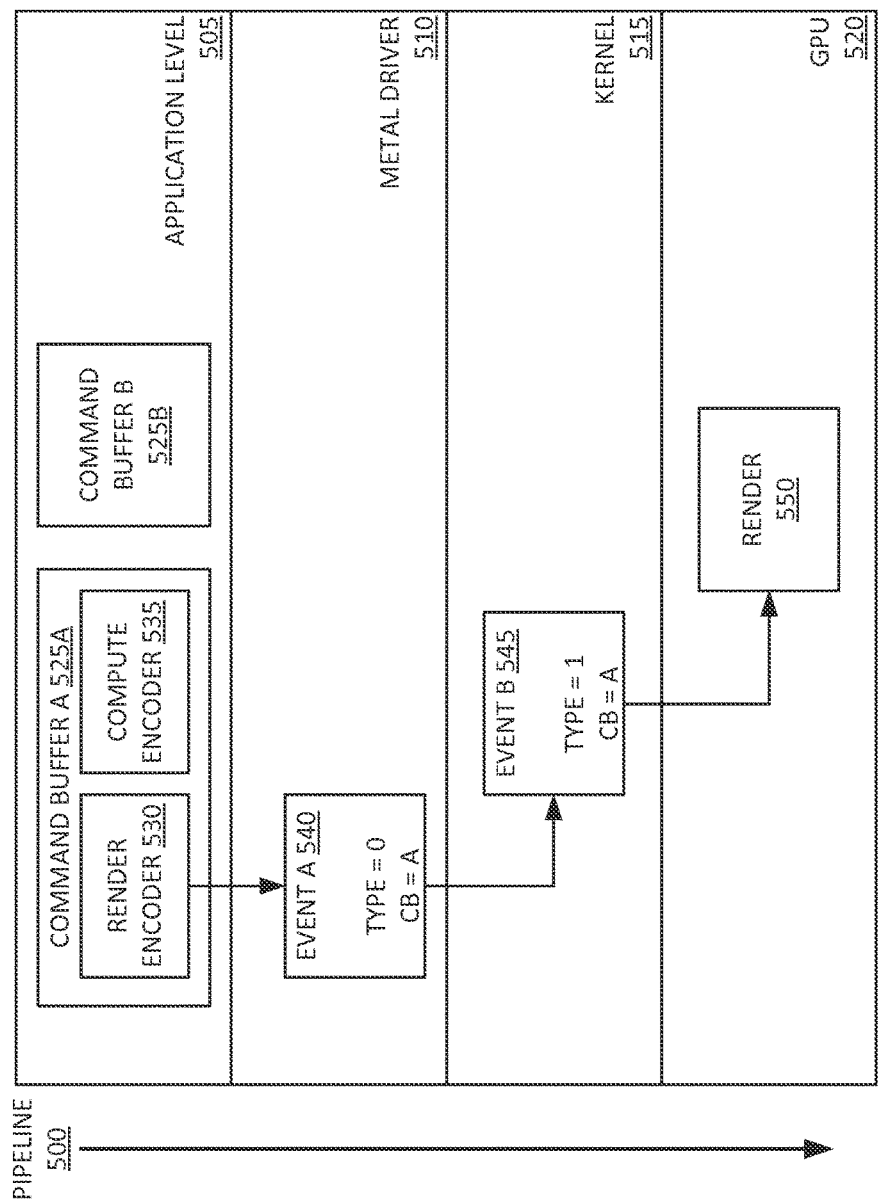
FIG. 5 shows, in block diagram form, an example GPU pipeline, according to one or more embodiments.

FIG. 5 shows, in block diagram form, an example GPU pipeline, according to one or more embodiments. It should be understood that the example shown in FIG. 5 is depicted merely for purposes of clarity, and is not intended to limit the disclosure. Specifically, FIG. 5 shows how events 540 and 545 are generated from a command buffer 525 as the command buffer 525 passes through a GPU pipeline 500.

As depicted, a number of command buffers 525 may be generated by applications at the application level 505 of the pipeline 500. Each of these command buffers may represent a logical or functional amount of work associated with the GPU 520. Each command buffer may include a number of encoders, such as render encoder 530 or compute encoder 535. For purposes of this example, the events generated from the render encoder 530 are followed through the pipeline 500.

For purposes of this example, when the render encoder 530 meets the metal driver 510, event A 540 is generated. According to one or more embodiments, it is determined, for example by a systrace tool, that event A 540 is of type 0. It is also determined that event A 540 originated from command buffer A 525A. Thus, event A 540 may be tagged with a type "0" and optionally an originating command buffer "A". In one or more embodiments, the tagged event may be stored in kernel memory. Similarly, for purposes of this example, at the kernel level 515, event B 545 may be generated. As shown in FIG. 5, event B 545 is of type 1. It is also determined that event B 54B originated from command buffer A 525A. Thus, event B 545 is tagged with a type "1" and optionally an originating command buffer "A". In one or more embodiments, the tagged event may also be stored in kernel memory. The render encoder 530 then reaches GPU 520, and the render function 500 is performed by the GPU. Because the events may be tagged with information identifying an event type and/or a parent command buffer, a developer may later access and review events based on event type.

Figure 6:
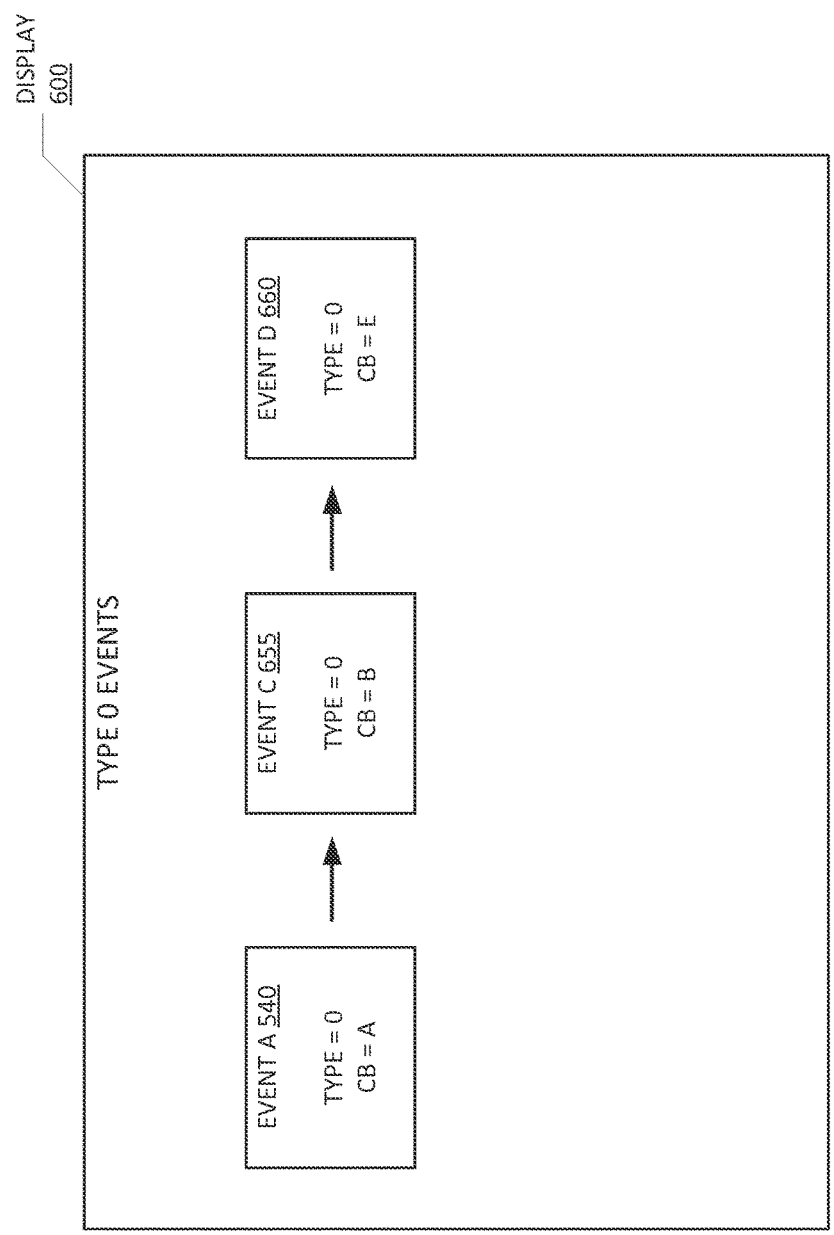
FIG. 6 shows, in block diagram form, an example user interface, according to one or more embodiments.

FIG. 6 shows, in block diagram form, an example user interface, according to one or more embodiments. It should be understood that the example shown in FIG. 6 is depicted merely for purposes clarity, and is not intended to limit the disclosure. FIG. 6 depicts a user interface in a display 600, that shows an example result of a query for events of a particular type. In one or more embodiments, the user interface may be generated by a systrace visualization tool. As depicted, events 540, 655, and 660 are depicted in timeline form, although in one or more embodiments, the various events may be depicted in any manner that indicates a temporal order. As depicted in this example, a developer may request events of type "0." Event A 540 is taken from FIG. 5, and indicates an event with type "0," and an originating command buffer "A." Event C 655 is also type "0," but originates from command buffer "B." Again, event D 660 is also type "0," but originates from command buffer "E." Thus, in one or more embodiments, the user interface may provide a holistic view of all work of a particular type being performed in the GPU pipeline.

In practice, it has been found beneficial to use the above disclosure to provide a holistic view of work performed by the GPU. A thread-based view is an alternative type view, but may be insufficient. Particularly, command buffers and render encoders may be prepared across multiple threads, but the various threads can be immaterial to the analysis of the work performed by the GPU. Further, in one or more embodiments, the GPU may not have threads in the conventional CPU manner. Thus, a holistic view, rather than a thread-based view, of work performed by a GPU may provide a developer with a better picture. Finally, variations of the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A graphics processing unit (GPU) task tracking method, comprising:
receiving a plurality of GPU command buffers, wherein each of the plurality of GPU command buffers includes a memory buffer holding a plurality of commands for execution by the GPU, wherein each of the plurality of commands of each of the plurality of GPU command buffers is encoded by one of a plurality of encoders, the plurality of encoders including a render encoder and a compute encoder;
executing the plurality of GPU command buffers; and
generating, in response to execution of the plurality of GPU command buffers, a plurality of events at different portions of a GPU pipeline, wherein the generating includes:
tagging each event with a unique event-type identifier, wherein for each of the plurality of events, the respective unique event-type identifier identifies one of the plurality of encoders that encoded a command corresponding to the event;
tagging each event so as to identify one of the plurality of GPU command buffers that, once executed, generates the respective event; and
storing each tagged event in a memory.

2. The method of claim 1, wherein executing the plurality of GPU command buffers comprises:
executing a first portion of each of the plurality of GPU command buffers by a central processing unit (CPU), the first portion generating a first event; and
executing a second portion of each of the plurality of GPU command buffers by a GPU, the second portion generating a second event.

3. The method of claim 1, wherein the memory comprises a kernel portion of an operating system memory.

4. The method of claim 1, further comprising displaying, in a temporally ordered sequence and from among the plurality of events, a first subset of events that have the same unique event-type identifier, wherein a first one of the first subset of events is generated in response to execution of a first one of the plurality of GPU command buffers, and a second one of the first subset of events is generated in response to execution of a second one of the plurality of GPU command buffers.

5. A non-transitory program storage device for tracking graphics processing unit (GPU) tasks, readable by a processor and comprising instructions stored thereon to cause one or more processors to:
receive a plurality of GPU command buffers, wherein each of the plurality of GPU command buffers includes a memory buffer holding a plurality of commands for execution by the GPU, wherein each of the plurality of commands of each of the plurality of GPU command buffers is encoded with one of a plurality of encoders, the plurality of encoders including a render encoder and a compute encoder;
execute the plurality of GPU command buffers; and
generate, in response to execution of the plurality of GPU command buffers, a plurality of events at different portions of a GPU pipeline, wherein the instructions that cause the one or more processors to generate the plurality of events comprise instructions that cause the one or more processors to:
tag each event with a unique event-type identifier, wherein for each of the plurality of events, the respective unique event-type identifier identifies one of the plurality of encoders that encoded a command corresponding to the event;
tag each event so as to identify one of the plurality of GPU command buffers that, once executed, generates the respective event; and
store each tagged event in a memory.

6. The non-transitory program storage device of claim 5, wherein the instructions that cause the one or more processors to execute the plurality of GPU command buffers further comprise instructions that cause the one or more processors to:
execute a first portion of each of the plurality of GPU command buffers by a central processing unit (CPU), the first portion generating a first event; and
execute a second portion of each of the plurality of GPU command buffers by a GPU, the second portion generating a second event.

7. The non-transitory program storage device of claim 5, wherein the memory comprises a kernel portion of an operating system memory.

8. The non-transitory program storage device of claim 5, wherein the instructions further cause the one or more processors to display, in a temporally ordered sequence and from among the plurality of events, a first subset of events that have the same unique event-type identifier, wherein a first one of the first subset of events is generated in response to execution of a first one of the plurality of GPU command buffers, and a second one of the first subset of events is generated in response to execution of a second one of the plurality of GPU command buffers.

9. A method for displaying graphics processing unit (GPU) tasks, comprising:
obtaining, from a kernel portion of an operating system memory, a plurality of event records of a first type, each event record corresponding to an event, wherein different event records are generated at different portions of a GPU pipeline, wherein the plurality of event records of the first type are generated in response to execution of a plurality of GPU command buffers, each of the plurality of GPU command buffers including a memory buffer holding a plurality of commands for execution by the GPU, wherein each of the plurality of commands of each of the plurality of GPU command buffers is encoded by one of a plurality of encoders, the plurality of encoders including a render encoder and a compute encoder;
partitioning the plurality of event records into two or more collections of event records, wherein each event record in each collection includes:
a tag associating the event record with the first type, wherein for each of the plurality of event records, the respective tag associating the event record with the first type identifies one of the plurality of encoders that encoded a command corresponding to the event record, and a tag associating the event record with a GPU command buffer identifier indicating one of the plurality of GPU command buffers that, once executed, generated the respective event record; and displaying two or more of the event records of a first collection in a first temporally ordered sequence.

10. The method of claim 9, further comprising:

displaying two or more of the event records of a second collection of the two or more collections in a second temporally ordered sequence such that the event records from the first collection are visually distinct from the event records from the second collection.

11. The method of claim 9, wherein the two or more collections respectively correspond to two or more of the GPU command buffers.

12. The method of claim 9, wherein displaying the two or more of the event records in the first temporally ordered sequence comprises displaying the two or more of the event records with a corresponding GPU command buffer identifier displayed.

13. A non-transitory program storage device for displaying graphics processing unit (GPU) tasks, readable by a processor and comprising instructions stored thereon to cause one or more processors to:

obtain, from a kernel portion of an operating system memory, a plurality of event records of a first type, each event record corresponding to an event, wherein different event records are generated at different portions of a GPU pipeline, wherein the plurality of event records of the first type are generated in response to execution of a plurality of GPU command buffers, each of the plurality of GPU command buffers including a memory buffer holding a plurality of commands for execution by the GPU, wherein each of the plurality of commands of each of the plurality of GPU command buffers is encoded by one of a plurality of encoders, the plurality of encoders including a render encoder and a compute encoder;

partition the plurality of event records into two or more collections of event records, wherein each event record in each collection includes:

a tag associating the event record with the first type, wherein for each of the plurality of event records, the respective tag associating the event record with the first type identifies one of the plurality of encoders that encoded a command corresponding to the event record, and a tag associating the event record with a GPU command buffer identifier indicating one of the plurality of GPU command buffers that, once executed, generated the respective event record; and display two or more of the event records of a first collection in a first temporally ordered sequence.

14. The non-transitory program storage device of claim 13, wherein the instructions further cause the one or more processors to:

display two or more of the event records of a second collection of the two or more collections in a second temporally ordered sequence such that the event records from the first collection are visually distinct from the event records from the second collection.

15. The non-transitory program storage device of claim 13, wherein the two or more collections respectively correspond to two or more of the GPU command buffers.

16. The non-transitory program storage device of claim 13, wherein the instructions to cause the one or more processors to display the two or more of the event records in the first temporally ordered sequence comprise instructions to cause the one or more processors to display the two or more of the event records with a corresponding GPU command buffer identifier displayed.

* * * * *